(Model.) 2 Sheets—Sheet 1.
J. STONE.
METHOD OF MAKING BUTTON HOLE STRIPS.
No. 370,903. Patented Oct. 4, 1887.
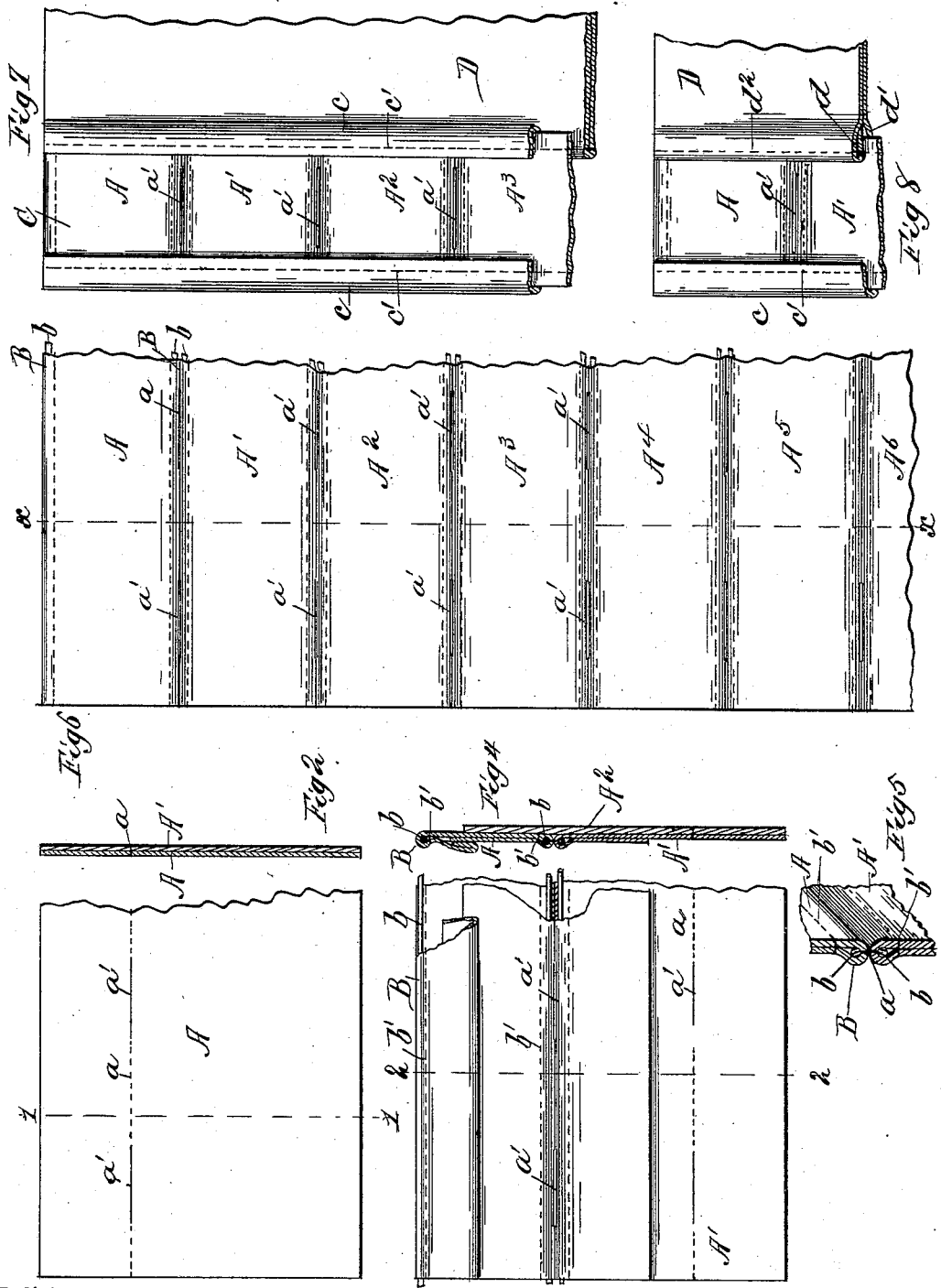
Witnesses
W. C. Coolies
Irvine Miller
Inventor
James Stone
By Coburn & Thacher
Attorneys

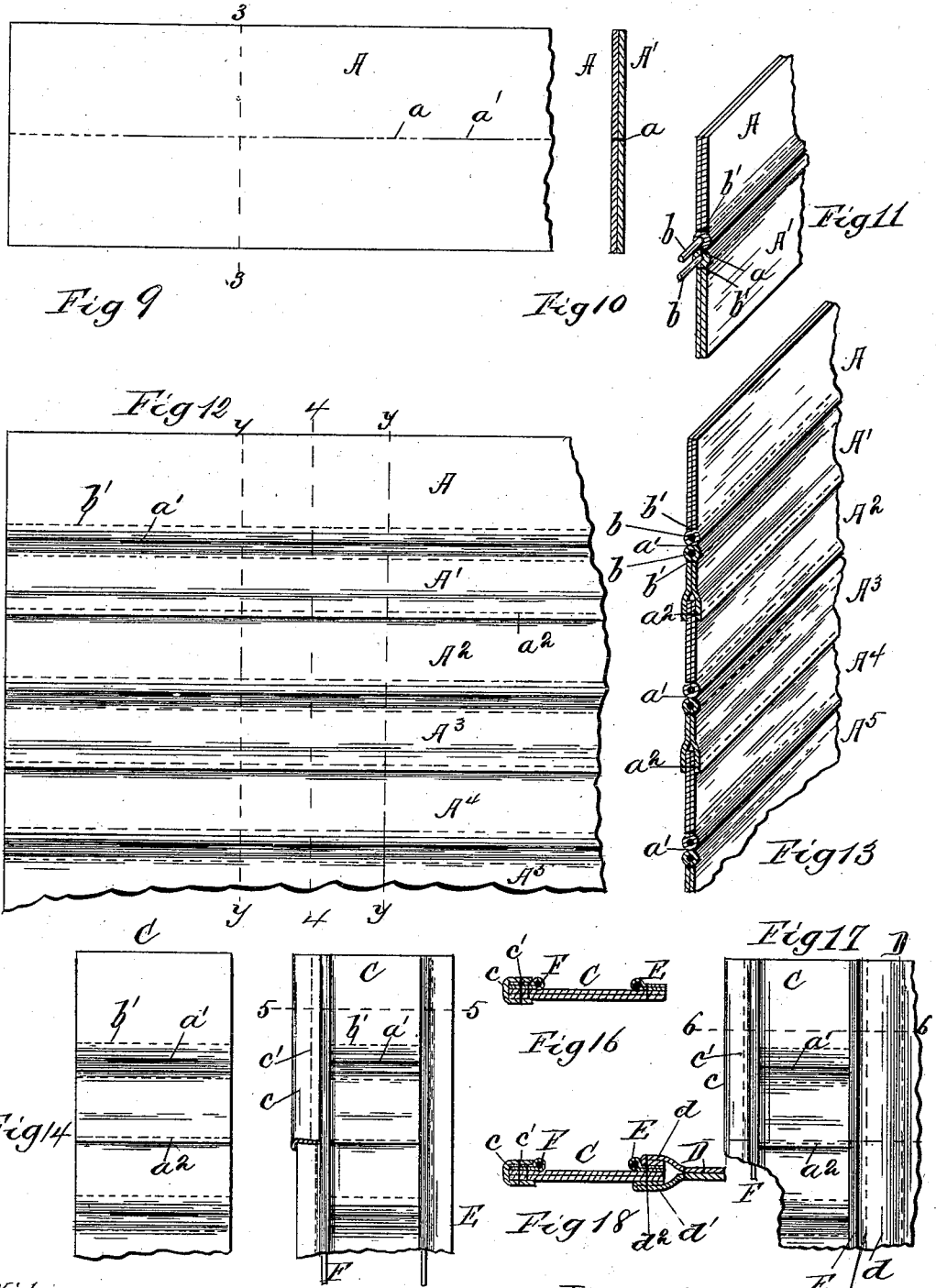

UNITED STATES PATENT OFFICE.

JAMES STONE, OF AURORA, ILLINOIS.

METHOD OF MAKING BUTTON-HOLE STRIPS.

SPECIFICATION forming part of Letters Patent No. 370,903, dated October 4, 1887.

Application filed May 21, 1887. Serial No. 239,014. (Model.)

*To all whom it may concern:*

Be it known that I, JAMES STONE, a citizen of the United States, and residing at Aurora, in the county of Kane and State of Illinois, have invented a certain new and useful Improvement in Button-Holes, which is fully set forth in the following specification, reference being had to the accompanying drawings, in which—

Figure 1 is a view illustrating the first step in the mode of constructing button-holes which I have invented; Fig. 2, a sectional view taken on the line 1 1 of Fig. 1; Fig. 3, a view showing the article in a more advanced stage, one line of button-holes being finished and a second partly so; Fig. 4, a sectional view taken on the line 2 2 of Fig. 3; Fig. 5, an enlarged detail sectional view, seen in perspective, of the joined edges of the strips shown in Fig. 4; Fig. 6, a face view of a sheet provided with finished button-holes and ready to be cut into button-hole strips; Fig. 7, a similar view of one of the strips after being cut from the sheet, bound on both edges, and secured to a garment; Fig. 8, a view similar to Fig. 7, illustrating a modification of the manner of securing the strip to the garment; Fig. 9, a view corresponding to Fig. 1 and illustrating a modification of my invention; Fig. 10, a sectional view taken on the line 3 3 of Fig. 9; Fig. 11, a detail perspective view, partly in section, showing the material in a more advanced stage of completion; Fig. 12, a face view of a button-hole sheet embodying my invention in this modified form; Fig. 13, a sectional view taken on the line 4 4 of Fig. 12 and viewed in perspective; Fig. 14, a detail face view of one of the button-hole strips cut from the sheet shown in Fig. 12; Fig. 15, a face view of the same bound and provided with a gage-strip and abutment; Fig. 16, a detail sectional view taken on the line 5 5 of Fig. 15; Fig. 17, a face view of the strip shown in Fig. 15 when applied to the garment; and Fig. 18, a sectional view of the same, taken on the line 6 6 of Fig. 17.

Like letters refer to like parts in all the figures of the drawings.

My invention relates to the art of making button-holes, and has for its object to provide a mode of manufacture by means of which may be produced what is known as a "button-hole strip" for attachment to garments, such as corsets or the like. My invention has in view more particularly the production of such strips in large quantities in a rapid and inexpensive manner, the method being such that only straight seams—such as may be readily made by the ordinary sewing-machine—are necessary in the carrying out of the same.

To these ends my invention consists in joining by their edges a series of long strips by sewing, leaving gaps unsewed at regular intervals, and then severing the strips transversely between the gaps, thereby forming a series of button-hole strips.

I will now proceed to describe in detail the process which I employ in carrying out my invention in one way, and will then particularly point out in the claims those features which I deem to be new and desire to protect by Letters Patent.

Referring, now, to Figs. 1 and 2, two strips, A and A', of cloth of suitable width are placed face to face and joined by a line of stitching, *a*. At regular intervals, suitably spaced apart, gaps *a'* are left, which serve ultimately to form the button-holes. In practice the line of stitching will be continuous, and the gaps *a'* will be formed by feeding the cloth forward the proper distance while the sewing-machine is stopped, the stitching then being resumed at the proper place. In the drawings I have shown but a small portion of the completed strips A and A', they being in practice of any desired length; but the small portion shown will serve to illustrate the invention. The strips A and A' having thus been joined by the line of stitching *a*, each strip is folded upon itself upon the said line of stitching, so that the two strips, joined by their folded edges, will lie in the same plane, extending in opposite directions from their line of junction, as shown in Figs. 3 and 4 of the drawings. In order to give the strips the proper finish and strength, I prefer to employ along their joined edges stiffening-cords *b*, which, when the strips are folded along the line of stitching *a*, as hereinbefore described, are introduced into the folded edges B, produced by this folding back of the strips upon themselves, and are secured in position by lines of stitching *b'*, as clearly shown in Figs. 3, 4, and 5 of the drawings. The strip A is at the top of the button-hole sheet, and its upper or free edge, which is not joined to any other strip, is preferably corded and seamed in the same manner as that edge of the strip which is joined to the strip A′, the object of this being to properly finish what will be the end of the finished button-hole strip. The strips A and A′ having been treated in the manner described, a third strip, $A^2$, similar to the said strips A and A′, is stitched to the free portion of the strip A′ by means of a line of stitching, $a$, in which gaps $a'$ are left, in the manner hereinbefore described. The strip $A^2$ is shown in Figs. 3 and 4 in the position which it occupies after being stitched in this manner to the strip A′. The strips A′ and $A^2$ are then folded back upon themselves upon the line of stitching $a$ which connects the two. The stiffening-cords are then introduced into the folding edges and secured in position in the manner described in referring to the strips A and A′. In like manner a strip, $A^3$, is stitched to the strip $A^2$, and this operation of adding strip after strip is continued until a structure such as that shown in Fig. 6 is obtained, consisting of a sheet composed of strips A A′ $A^2$ $A^3$ $A^4$ $A^5$ $A^6$, &c., of a total width equal to the length of the completed button-hole strip which it is desired to produce. In each case the strips have been joined by lines of stitching $a$ with gaps $a'$ to form the button-holes, and in the construction preferred the joined edges of the strip are corded and seamed, in order to stiffen and strengthen the same. The sheet shown in Fig. 6 is then formed into strips by cutting along transverse lines such as those shown by the dotted lines $x$ $x$ in said figure, the severed portion, as shown in Figs. 7 and 8, consisting of a strip, C, formed of a series of sections from the several strips A A′ $A^2$, &c., the junctions between each adjacent pair of sections being provided with one of the gaps $a'$, which serve to form the button-holes. The strip C is then preferably bound at its edges by means of binding-strips $c$, folded longitudinally to receive the edges of the strip A within the folds, and secured thereto by a line of stitching, $c'$.

The completed button-hole strip C may be secured to the garment in any suitable manner—such, for instance, as that shown in Fig. 7 of the drawings, in which the line of stitching $c'$, which secures the inner binding, $c$, to the strip C, also serves to secure the said strip to the edge of the fabric D of the garment. This is only one method, however, of securing the button-hole strip to the garment, and it is obvious that the same result may be effected in various other ways. For instance, in Fig. 8 of the drawings I have shown one edge of the strip as sewed in between the edges $d$ and $d'$ of the garment D and secured by the line of stitching $d^2$, and in this case the binding $c$ of the inner edge of the strip C is preferably omitted, in order to decrease the bulk of the garment at this point.

In the construction just described the seam connecting each two strips is provided with a line of button-holes; but it is obvious that this method of constructing the button-hole sheet may be somewhat modified. In Figs. 9 to 14 of the drawings such a modification is shown. As will be seen from Figs. 9 and 10, the two strips A and A′ may have the line of stitching $a$, with its gaps $a'$, located about centrally of the width of the strips, in which case, when the said strips are folded back, a construction such as that shown in Fig. 11 will be the result. Another pair of strips, $A^2$ and $A^3$, are then joined in the same manner, and the edge of one of these pair of strips—say, for instance, the strip $A^2$—is joined to the edge of one of the strips of the first pair—say, for instance, the strip A′—by means of a line of stitching, $a^2$, and this process is continued, other pairs of strips being added, as shown at $A^3$ and $A^4$, until a sheet of the desired dimensions—such as that shown in Figs. 12 and 13—is obtained. This modification differs from that previously described simply in the fact that the strips are first joined in pairs and that the sheet is built up by stitching together these pairs of strips, instead of stitching together single strips. It is of course understood that suitable cords, $b$, may be placed in the folded edges of the strips, as in the first case. The finished sheet will be then formed into button-strips C by cutting along the lines $y$ $y$ between the button-holes, one of the severed button-hole strips being shown at C in Fig. 14.

In practice in applying the button-hole strip to a garment, I prefer to employ a strengthening-abutment, F, which may be constructed in the manner set forth in an application filed by me of even date herewith, Serial No. 239,013. I also prefer to employ a gage-strip, E, along that margin of the button-hole strip which is let into the garment D, this gage-strip being shown and described in another application filed by me May 17, 1887, Serial No. 238,447, and serving to accurately determine the position of the button-hole strip with relation to the garment.

It will be seen that by the mode which I have described I am enabled to produce button-hole strips in large quantity in a rapid and inexpensive manner, since the whole of the work may be done upon any ordinary sewing-machine without the use of specially-skilled labor.

It is obvious that various modifications in the details of the construction, as well as some of the minor steps in the method hereinbefore pointed out, may be modified or dispensed with without departing from the principle of my invention. For instance, although I have described the introduction of a cord in the edges of the transverse strips, this feature may be dispensed with, although I prefer the same. The binding along the edges of the completed button-hole strip may be also dispensed with, although their use is obviously advantageous. Various other modifications will readily suggest themselves, and I therefore do not wish to be understood as limiting myself strictly to the precise details hereinbefore described, and shown in the drawings.

Having thus described my invention, what I claim as new, and desire to secure by Letters Patent, is—

1. The hereinbefore-described mode of making button-hole strips, which consists in joining by their edges a series of long strips by sewing, leaving gaps unsewed at regular intervals, and then severing the strips transversely between the gaps, thereby forming a series of button-hole strips, substantially as and for the purposes specified.

2. The hereinbefore-described mode of making button-holes, which consists in sewing together a series of long strips along their edges, leaving gaps unsewed at regular intervals, then severing the strips transversely between the gaps, and then binding the edges of the severed strips to form the finished button-hole strips, substantially as and for the purposes specified.

3. The hereinbefore-described mode of making button-hole strips, which consists in sewing together long strips near their edges, leaving gaps unsewed at regular intervals, folding back the loose ends and securing within the folds stiffening-cords, and then severing the strips transversely between the gaps to form the button-hole strips, substantially as and for the purposes specified.

JAMES STONE.

Witnesses:
 IRVINE MILLER,
 ORSON H. BROOKE.